March 17, 1970  R. C. FRANK  3,501,194
MOTOR HOME CONVERSION UNIT
Filed Oct. 3, 1967
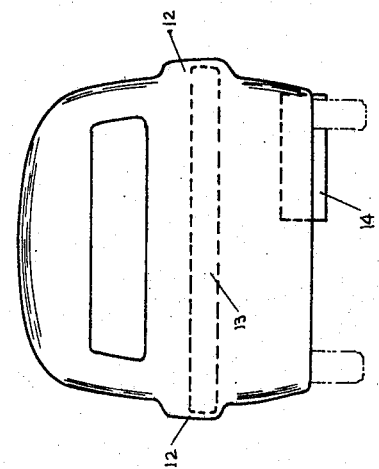
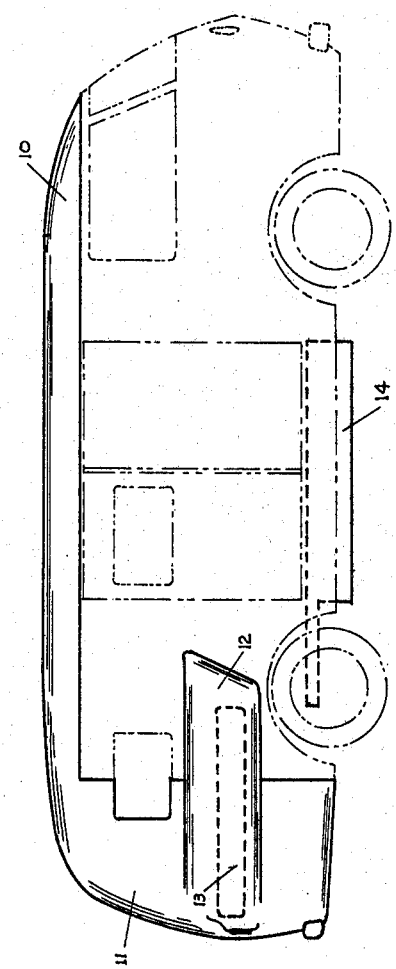
Raymond C. Frank

United States Patent Office 3,501,194
Patented Mar. 17, 1970

3,501,194
MOTOR HOME CONVERSION UNIT
Raymond C. Frank, Sanilac County, Mich., assignor to Environetics, Inc., Gardena, Calif., a corporation of California
Filed Oct. 3, 1967, Ser. No. 672,653
Int. Cl. B60p 3/32
U.S. Cl. 296—23          5 Claims

ABSTRACT OF THE DISCLOSURE

A conversion unit for small van-like vehicles which raises the roof line and provides an extension at the end of the vehicle that is particularly suited for accommodating a bed therewithin.

BACKGROUND OF THE INVENTION

Most delivery vans that are converted for travel and camping purposes do not have enough head room to allow persons of normal height to stand erect and move about in reasonable comfort.

They are also too small for other than a fold-down or fold-out type of seat that converts to sleeping accommodations and, as a consequence, do not allow anyone to lie down or retire for the evening until everyone is ready to do so.

It follows, quite obviously, that present delivery vans are not ideally suited for travel and/or camping purposes unless they are modified in some way to provide more head room and better sleeping facilities.

SUMMARY OF THE PRESENT INVENTION

The present invention relates to a means and method of converting a delivery van or like type vehicle to more suitable use for camping and like purposes by raising the roof line and adding an extension for sleeping accommodations.

The conversion unit is of fiberglass or like material with the extension and replacement roof formed together and made to fit a particular van that has its normal roof cut at the eave line and the back of the vehicle cut off square at its side wall line.

The attachment of the conversion unit is by conventional means and forms no particular part of this invention. The finishing and furnishing of the interior space of a converted vehicle is also a matter of convention, or personal taste, except that the extension part is particularly suited for accommodating a double size bed cross-wise of the vehicle in a rather unique and clever manner.

As will be shown and described, the vehicle extension is formed to include a bubble wall protuberance on each side, which blends with the vehicle styling and, more important, provides a lateral width which enables a full length double size bed to be received and easily accommodated cross-wise within the extended end of the converted vehicle.

DESCRIPTION OF THE DRAWINGS

FIGURE 1 is a side plan view of a van type vehicle, in phantom outline, with the conversion unit of the present invention shown as a part thereof.

FIGURE 2 is a rear end view of the vehicle and conversion unit shown in the first drawing figure.

DETAILED DESCRIPTION OF THE ILLUSTRATED EMBODIMENT

In the practice of the present invention, a van type vehicle of the type commonly known and used for delivery purposes, and as shown in phantom outline in FIGURE 1, has its normal relatively flat roof cut off and also has the rear end of the vehicle body cut square across at its juncture with the vehicle side walls.

The roof of the vehicle is actually cut three to six inches inside the side walls to provide a mounting surface for the roof of the conversion unit, for adhesives, screws, rivets, or the like, but this is not shown since other bracket means or mounting methods are equally serviceable.

It will also be appreciated that the rear doors which are normally provided with this type of a van may be used at the side of the vehicle, if arrangements are made with the manufacturer to provide the commercially available van with the side opening but without the doors, since the door sets are normally interchangeable.

The conversion unit itself is of preformed molded fiberglass, or other suitable material, formed to include a new roof 10 and a new rear extension 11 for the vehicle. The mounting of the rear extension to the end of the van, as with the roof 10, is a matter of choice and may be by a slight overlap and attachment to the normal vehicle side walls, or otherwise, and consequently has not been specifically shown. It will be appreciated that the vehicle frame is extended, although not shown, to provide support and also to carry the vehicle bumper at the rear of the van.

Although not necessary in all instances, a drop floor 14 near the side service doors is helpful in making the interior space have even more head room space and is recommended in the conversion work of adding the new roof line and rear end extension.

Of most significance in the conversion unit, over and beyond the advantages of added head room and length, is the provision for more width within the extension part 11. This is accomplished by bubble wall extensions 12 on each side of the rear end extension which actually extend forward, as shown, and appear to overlap the normal vehicle side walls. In some instances there may be an actual overlap, which then requires cutting away the side wall part under the protuberances 12, but in others there may be an adaptation suited to a vehicle styling which includes some wrap around panel configuration, as for the vehicle's tail lights, and wherein the two like panel wall bulges may be blended together.

As best shown in FIGURE 2, the side wall protuberances 12 readily enable a double size bed 13 of normal length to be accommodated and supported within the extended end of the converted van. Side and rear windows are shown over the sleeping area and will be appreciated as readily provided in the conversion process.

The vehicle, as finally outfitted, includes the bedroom alcove in the newly added extension, has a bathroom with a toilet, a dinette space, and a kitchen area complete with water containers and pumps, a sink, a refrigerator, and a cook stove. A space heating unit, serviced by L.P. gas is provided and there is ample closet and storage space within the vehicle to provide a completely self-contained motor home.

I claim:
1. A conversion unit for delivery van type vehicles and the like, comprising:
   a full vehicle end extension for attachment to a receptive vehicle and to take the place of the after end thereof,
   a vehicle roof structure providing a roof closure for said extension and formed to extend over the receptive vehicle and to replace at least a part of the roof thereof for providing more headroom thereunder,
   and said extension including lateral protuberances on each side thereof suitable for accommodating a conventional size bed lengthwise therebetween.

2. The conversion unit of claim 1,
said extension and roof structure being of molded fiberglass preformed and integrally united.

3. The conversion unit of claim 2,
said roof structure being a full and complete replacement of the normal roof of said vehicle.

4. The conversion unit of claim 3,
said lateral protuberances extending forwardly and relatively over the normal side walls of the receptive vehicle for accommodating a bed of greater width therebetween than the length of said extension would otherwise permit.

5. The method of onverting a delivery van type vehicle and the like for motor home use, comprising the steps of:
cutting off the rear end of a vehicle to be converted and removing at least the center section of the vehicle roof forwardly thereof,
preforming and attaching to said vehicle a vehicle end and roof replacement of molded fiberglass and integral construction to extend the length of the vehicle and provide a higher roof line therefor,
and forming the vehicle end extension with lateral protuberances to accommodate and provide support for a conventional length bed cross-wise therewithin.

References Cited

UNITED STATES PATENTS

| 3,284,127 | 11/1966 | Willson | 296—23 |
| 2,743,955 | 5/1956 | Willson | 296—23 |
| 3,297,355 | 1/1967 | Robinson | 296—23 |

PHILIP GOODMAN, Primary Examiner

U.S. Cl. X.R.

296—28

PO-1050
(5/69)

UNITED STATES PATENT OFFICE
CERTIFICATE OF CORRECTION

Patent No. 3,501,194      Dated March 17, 1970

Inventor(s) Frank, Raymond C.

It is certified that error appears in the above-identified patent and that said Letters Patent are hereby corrected as shown below:

In the heading, column 1, lines 3-5, delete ", assignor to Environetics, Inc., Gardena, Calif., a corporation of California."

SIGNED AND
SEALED

OCT 27 1970

(SEAL)
Attest:

Edward M. Fletcher, Jr.
Attesting Officer

WILLIAM E. SCHUYLER, JR.
Commissioner of Patents